United States Patent [19]

Kersey

[11] 3,995,565
[45] Dec. 7, 1976

[54] EXTENSIBLE TELESCOPING CARGO BRACE

[76] Inventor: Henry C. Kersey, 1105 Sixth St. SW., Canton, Ohio 44707

[22] Filed: Nov. 13, 1975

[21] Appl. No.: 631,728

[52] U.S. Cl. ............................. 105/497; 61/41 A; 105/493; 182/178; 182/201; 248/354 S; 254/133 A; 280/179 B

[51] Int. Cl.² .................. B60P 7/00; B61D 45/00; B66F 3/14; E04G 25/06

[58] Field of Search ......... 61/41 A, 45 C; 105/486, 105/489, 493, 494, 495, 496, 497, 498, 499, 502, 503, 376; 182/107, 129, 178, 201; 214/1 SW; 248/354 R, 354 H, 354 S, 356; 254/118, 133 A; 280/179 R, 179 A, 179 B

[56] References Cited
UNITED STATES PATENTS

| 923,463 | 6/1909 | Taylor | 105/497 X |
|---|---|---|---|
| 2,543,175 | 2/1951 | Kilgore | 105/497 |
| 3,049,328 | 8/1962 | Bishop | 248/354 S |
| 3,110,506 | 11/1963 | O'Brien | 280/179 B |
| 3,699,898 | 10/1972 | Nolan | 105/376 |
| 3,836,174 | 9/1974 | Holman, Jr. | 248/356 |
| 3,912,139 | 10/1975 | Bowman | 105/497 |

Primary Examiner—L. J. Paperner
Assistant Examiner—Howard Beltran
Attorney, Agent, or Firm—Frease & Bishop

[57] ABSTRACT

An extensible cargo brace for extending between and maintaining firm contact with opposite walls of a cargo vehicle. A pair of spaced inner rails is slidably, telescopically mounted within a pair of spaced outer rails with a plurality of rungs extending transversely between the rails of each pair. Tension springs are mounted within the outer rails and engageable with the inner rails normally biasing the inner rails into retracted position within the outer rails. A detent rack bar extends between adjacent rungs of the inner and outer rails and is fixed with respect to one pair of the rails and movable with respect to the other pair of rails. Lever actuated ratchet means is mounted on the other pair of rails and engages the detent rack for positively expanding the rails outwardly into engagement with the vehicle walls when a directional control toggle of the lever-ratchet means is in an advance position. The tension springs retract the rails when the lever-ratchet means is operated when the directional control toggle is in return position.

10 Claims, 9 Drawing Figures

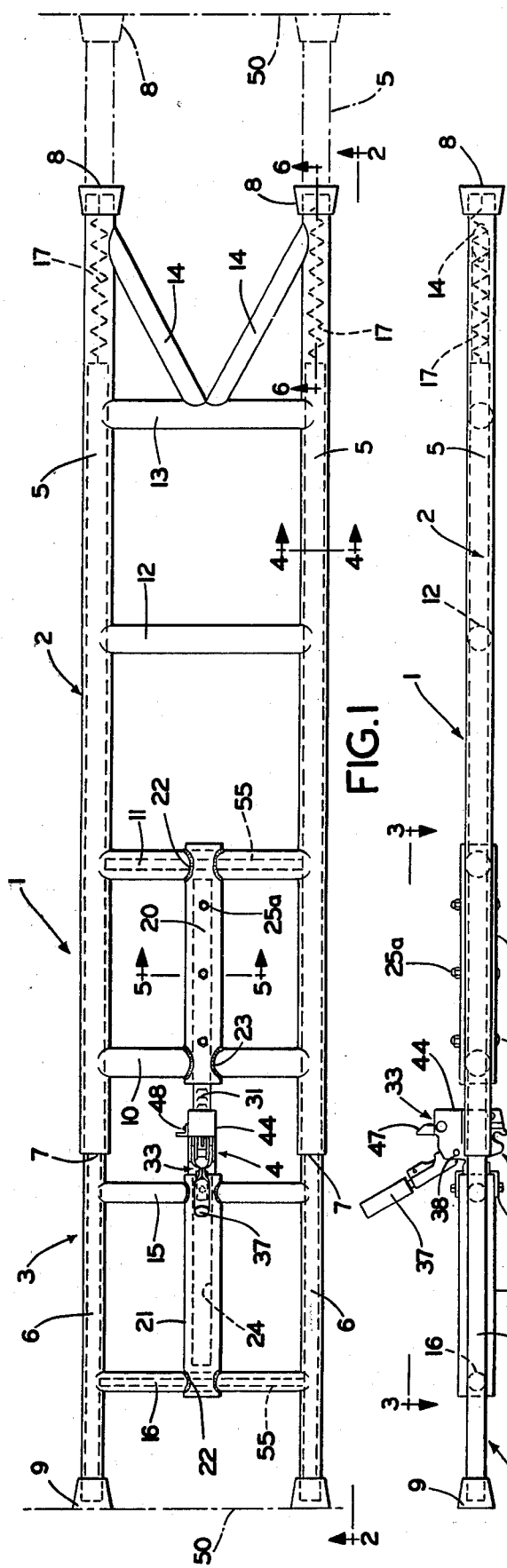

EXTENSIBLE TELESCOPING CARGO BRACE

BACKGROUND OF THE INVENTION

1. Field of the Invention

The invention relates to extensible cargo brace devices for extending between the walls of a vehicle to retain the cargo therein. More particularly, the invention relates to a cargo brace having a pair of ladder-like retaining members which are expanded outwardly by positive lever actuated expansion means and returned by tension spring means.

2. Description of the Prior Art

Numerous types and styles of cargo braces have been constructed and are in use for retaining cargo within a vehicle. Problems, however, have been encountered with many of these known cargo braces in that considerable time is required to expand and retract the brace where the brace uses a threaded bar-type expansion and retraction mechanism, such as shown in U.S. Pat. Nos. 969,002 and 2,543,175. Other cargo brace constructions use springs for controlling the actuating lever or to provide the expansion tension for retaining the brace between the walls, such as shown in U.S. Pat. Nos. 3,049,328 and 3,110,506. Such spring controlled braces have not proved entirely satisfactory in that the spring characteristics change due to climate conditions and are susceptible to breakage. Also, where a spring biased control mechanism is used, such as shown in U.S. Pat. No. 3,049,328, the release button will freeze and become difficult to operate in cold weather, and it requires the operator to use one hand to depress the button and another hand to operate the lever.

Likewise, most extensible cargo braces comprise a single bar which does not provide sufficient area to retain the cargo from moving or shifting within the vehicle. Enlarged rings or projecting members have been mounted on known single bar constructions in order to increase such retension area, but due to their projecting natures these components are subject to breakage and are difficult to store and operate.

No extensible cargo brace construction of which I am aware has eliminated these problems by providing an extensible cargo brace formed by a pair of telescopically mounted ladder-like members having a positive mechanical actuator for expanding the members into position without requiring springs to achieve the clamping force, and which provides a relatively large cargo retaining area.

SUMMARY OF THE INVENTION

Objectives of the invention include providing an extensible cargo brace construction which has a pair of ladder-like members having spaced horizontally and vertically extending members which provide a relatively large cargo retaining area instead of the heretofore known single bar cargo braces; providing such a cargo brace which uses a positive mechanically actuated lever-jack expansion means for tensioning the brace between the walls of a vehicle when in installed position without requiring the use of springs to apply the tensioning force, and which permits the brace to be manually moved to its extended position prior to using the tensioning lever-jack mechanism for applying the final tensioning force thereon; providing such a cargo brace construction which can be formed of lightweight, rugged, hollow aluminum tubing, which is readily available and easily maintained, with the lever-jack tensioning mechanism being of a usual vehicle bumper-type construction, also easily and economically obtained, thereby eliminating the need for expensive, specially constructed component parts; providing such a cargo brace construction in which internal tension spring means retract the expanded members upon operation of the lever-jack mechanism to permit easy and rapid removal of the brace from the cargo retaining position; and providing an extensible cargo brace construction which eliminates difficulties heretofore encountered, achieves the stated objectives simply, efficiently and economically and solves problems and satisfies existing needs.

These objectives and advantages are obtained by the extensible cargo brace construction, the general nature of which may be stated as including a pair of spaced, parallel hollow outer rails having a plurality of rungs extending transversely therebetween, and terminating in inner and outer ends; a pair of spaced, parallel inner rails telescopically, slidably mounted with respect to the outer rails and movable between extended and retracted positions, and terminating in inner and outer ends; a plurality of rungs extending transversely between the spaced pair of inner rails; tension spring means mounted within the outer rails and engageable with the inner rails biasing the inner rails inwardly with respect to the outer rails toward retracted position; lever-actuated jack means mounted on and extending between certain of the rungs of the inner and outer rails for imparting relative movement between said inner and outer rails; the jack means including bar means having a plurality of recesses formed therein extending longitudinally between at least the inner endmost rungs of the inner and outer rails, the bar means being fixed with respect to one pair of the rails and movable with respect to the other pair of the rails, lever-ratchet means operatively mounted on said other pair of rails and engageable with the recesses of the bar means for controlling relative movement between the inner and outer rails, and directional control means mounted on the lever-ratchet means and movable between retract and expand positions for selectively controlling the direction of movement of the inner and outer rails with respect to each other upon operation of the lever-ratchet means; the lever-ratchet means positively moving the outer rails outwardly with respect to the inner rails toward extended position upon actuation of the lever-ratchet means with the directional control means in expand position; and the tension spring means moving the outer rails inwardly with respect to the inner rails toward retracted position upon actuation of the lever-ratchet means with the directional control means in retract position.

BRIEF DESCRIPTION OF THE DRAWING

A preferred embodiment of the invention — illustrative of the best mode in which applicant has contemplated applying the principle — is set forth in the following description and shown in the accompanying drawing, and is particularly and distinctly pointed out and set forth in the appended claims.

FIG. 1 is a front elevational view of the improved extensible cargo brace construction, with its extended position being shown in dot-dash lines;

FIG. 2 is a side view of the extensible cargo brace construction in retracted position, looking in the direction of Arrows 2—2, FIG. 1;

FIG. 3 is an enlarged fragmentary view, with portions broken away and in section, of the lever-jack expander mechanism;

FIG. 4 is an enlarged sectional view taken on line 4—4, FIG. 1;

FIG. 5 is an enlarged sectional view taken on line 5—5, FIG. 1;

FIG. 6 is an enlarged fragmentary sectional view taken on line 6—6, FIG. 1;

FIG. 7 is an enlarged fragmentary sectional view taken on line 7—7, FIG. 3;

FIG. 8 is an enlarged fragmentary view, with portions broken away and in section, looking in the directions of Arrows 8—8, FIG. 3; and FIG. 9 is a perspective view of a different type of protective feet for the ends of the improved cargo brace construction.

Similar numerals refer to similar parts throughout the drawing.

DESCRIPTION OF THE PREFERRED EMBODIMENT

The improved cargo brace construction is indicated generally at 1 and is shown particularly in FIGS. 1 and 2. Brace construction 1 includes an outer ladder-like member 2 and an inner ladder-like member 3, telescopically, slidably mounted within outer member 2. A lever-actuated jack mechanism, indicated generally at 4 is mounted on and extends between ladder members 2 and 3 for moving brace construction 1 between extended (dot-dash lines, FIG. 1) and retracted positions.

Outer ladder member 2 includes a pair of spaced parallel hollow rails 5, preferably having a circular cross-sectional, tubular configuration (FIG. 4). Inner ladder member 3 also includes a pair of parallel spaced rails 6, preferably having a hollow, tubular, cross-sectional configuration, which rails 6 are slidably received within the open ends 7 of outer rails 5. Protective feet or coverings 8 and 9 are mounted on the outer ends of outer rails 5 and inner rails 6, respectively, to prevent marring or scratching of the vehicle walls upon installation of cargo brace 1.

A plurality of rungs 10, 11, 12 and 13 extend transversely between outer rails 5 as shown in FIG. 1 with a pair of diagonally extending reinforcing members 14 extending between outermost rung 13 and the outer ends of rails 5. A plurality of rungs 15 and 16 also are formed on the inner ladder member 3 and extend transversely between spaced inner rails 3 adjacent the outer end thereof (FIG. 1). Rungs 10–13 and 15–16 preferably are formed of tubular aluminum, as are rails 5 and 6, thereby being lightweight and corrosion free.

A pair of tension springs 17 (FIGS. 1 and 6) are located in the enclosed outer ends of outer ladder member 2 and are secured to end plates 18 thereof, and to end plates 19 mounted on the inner ends of inner ladder member 3. Springs 17 are in tension and bias inner rails 6 inwardly with respect to outer rails 5. Reinforcing bars 55 preferably extend through rungs 11 and 16 (FIGS. 1 and 3).

Lever-actuated jack mechanism 4 is mounted on and extends between rungs 15 and 16 of inner ladder member 3 and rungs 10 and 11 of outer ladder member 2. Mechanism 4 includes a pair of tubular sleeves 20 and 21 (FIGS. 1 and 3) with rungs 11 and 16 extending through openings formed in the outer ends of sleeves 20 and 21 and being secured thereto by welds 22. The inner adjacent ends of sleeves 20 and 21 are attached by welds 23 to rungs 10 and 15, respectively, which rungs are not formed continuously as are rungs 11 and 16.

A ratchet-type jack bar 24 is mounted within and extends between sleeves 20 and 21 (FIGS. 3 and 5) and is fixedly mounted within sleeve 20 by a plurality of carriage bolts 25. Bolts 25 extend through openings 26 which are drilled through sleeve 20 and through holes 27 formed in bar 24, and are secured therein by nuts 25a and lock washers 25b. Bar 24 preferably has a trapezoidal configuration with a top wall 28, bottom wall 29, and tapered side walls 30. A plurality of usual detent receiving recesses 31 are formed in and are spaced longitudinally along top wall 28 of jack bar 24 as in a usual vehicle bumper jack construction. End 32 of jack bar 24 preferably abuts rung 11 to assist in absorbing the forces exerted on bar 24, thereby relieving the pressure on mounting bolts 25.

The other end of bar 24 is movably mounted with respect to sleeve 21 of inner ladder member 3. A lever-rachet mechanism indicated generally at 33, is attached to the inner end of sleeve 21 (FIG. 7) by a pair of angled brackets 34. Brackets 34 are welded at 35 to mechanism 33 and are removably mounted on sleeve 21 by a pair of bolts 36.

Lever-ratchet mechanism 33 (FIGS. 2, 3 and 8) and bar 24 which are the main components of jack mechanism 4 are the components of a usual vehicle ratchet-type bumper jack for raising and lowering a vehicle, as when changing a tire. Therefore, the complete construction and operation is not described in detail except for the generally internal mechanism preferably used as shown in FIG. 8. Mechanism 33 includes a lever 37 pivotally mounted at 38, with a first detent 39 pivotally mounted at 40 on lever 37, and a second detent 41 pivotally mounted at 42 on side wall 43 of lever-ratchet housing 44.

A spring 45 is mounted within housing 44 with its ends mounted on pivot pin 42 of second detent 41 and on a pin 46. A usual directional control toggle 47 is pivotally mounted on housing 44 by pin 48 (FIGS. 1 and 3) with its extended end 49 (FIG. 8) engaging spring 45. Control toggle 47 is movable between expand and retract selective positions.

Lever mechanism 33 provides a positive mechanical action to the movement of inner ladder member 3 with respect to outer ladder member 2 between extended and retracted positions by the engagement of detents 39 and 41 with recesses 31 (FIG. 8) in the same manner as a usual vehicle bumper jack when raising and lowering a vehicle. Actuation of lever 37 will move inner ladder member 3, sleeve 21, and lever mechanism 33 inwardly or outwardly with respect to jack bar 24 and outer ladder member 2 depending upon the position of directional toggle 47.

The operation of the improved extensible cargo brace construction is described below. An operator, when installing brace construction 1 in a horizontal position between a pair of vertical extending walls, indicated by dot-dash lines 50, places toggle 47 in its expand position. This position of toggle 47 corresponds to the raising position of a similar jack mechanism when used in a usual manner as a vehicle bumper jack. The operator grasps either rung 15 or 16 of inner ladder member 3 in one hand and grasps one of the rungs of outer ladder member 2 and exerts a spreading force thereon which rapidly moves outer member 2 from its full line retracted position of FIG. 1 to the expanded dot-dash line position into engagement with wall 50. The operator need not manipulate lever mechanism 33 in order to expand the brace outwardly, other than the prior setting of toggle 47. This eliminates considerable wasted motion heretofore required in prior extensible brace constructions. After manually moving outer member 2 into engagement with spaced walls 50, one or two operations of lever 37 positively, mechanically advances jack bar 24 outwardly with respect to lever mechanism 33 firmly expanding brace 1 between spaced vehicle walls 50.

The vertically spaced horizontal rail pairs 3 and 5, together with the horizontally spaced vertically extending rungs 10–13 and 15–16 provide a broad cargo retaining area instead of the heretofore single horizontal bar of known cargo brace constructions.

An operator, to remove cargo brace 1 from its mounted position, need only flip toggle 47 to its retract position followed by several operations of lever 37. Operation of lever 37 with toggle 47 in retract position enables springs 17 to move rails 6 inwardly in outer rails 5, releasing the expanding tension of brace 1 from vehicle walls 50. This release movement then enables the operator to manually remove brace 1 from its horizontal cargo retaining position. Springs 17 automatically retract ladder members 2 and 3 of brace 1 upon actuation of lever mechanism 33 eliminating any manual inward force being required on the part of the operator other than manipulation of lever 37. This retraction force is provided by the weight of a vehicle when a jack mechanism similar to mechanism 4 is used as a usual vehicle bumper jack. Repeated operations of lever 37 will retract brace 1 to its innermost position to provide a compact unit for storing the same.

FIG. 9 shows an alternate type of protective foot 51 which may be mounted on the outer ends of rails 5 and 6. Foot 51 preferably is formed of steel or metal with a protective rubber coating formed thereon, especially on the wall engaging end 52. The outer tubular ends of rails 5 and 6 are adapted to be telescopically received within open end 53 of tubular portion 54.

The improved cargo brace construction 1 provides a lightweight, rugged device for mounting in a horizontal or vertical position between the walls or floor and ceiling of a cargo storage vehicle, which brace can be installed and removed rapidly by an operator when loading and unloading cargo therefrom. The improved construction preferably is formed of lightweight corrosion-free tubular aluminum and uses a usual vehicle bumper lever-type jack mechanism for the expanding and contracting of the pair of ladder-like members to provide a positive mechanical expansion action, eliminating the use of springs to provide the expansion tension. Brace construction 1 is formed of components which can be disassembled and removed easily by removal of bolts 25 and 36 to permit replacement of various components should they become damaged, eliminating the purchase of an entirely new complete unit as in many existing cargo brace constructions. The improved construction provides a cargo brace which is relatively unaffected by weather and temperature changes and which, when not in use, provides a compact unit, free of projecting parts which can be stored conveniently in the vehicle.

Accordingly, the improved construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the extensible cargo brace construction is constructed and used, the characteristics of the construction, and the advantageous, new and useful results obtained; the new and useful structures, devices, elements, arrangements, parts, and combinations are set forth in the appended claims.

I claim:

1. Extensible cargo brace construction including
   a. a pair of spaced, parallel hollow outer rails having rung means extending transversely therebetween, said outer rails having inner and outer ends;
   b. a pair of spaced, parallel inner rails telescopically, slidably mounted with respect to the outer rails and movable between extended and retracted positions, said inner rails having inner and outer ends;
   c. rung means extending transversely between the spaced pair of inner rails;
   d. spring means operatively connected between the outer and inner rails biasing said inner rails inwardly with respect to the outer rails toward retracted position;
   e. lever-actuated jack means mounted on and extending between the rung means of the inner and outer rails for imparting relative movement between said inner and outer rails;
   f. the jack means having directional control means movable between retract and expand positions for selectively controlling the direction of movement of the inner and outer rails with respect to each other upon operation of the jack means;
   g. the jack means positively moving the outer rails outwardly with respect to the inner rails toward extended position upon actuation of said jack means with the directional control means in expand position; and
   h. The spring means moving the outer rails inwardly with respect to the inner rails toward retracted position upon actuation of the jack means with the directional control means in retract position.

2. The construction defined in claim 1 in which the jack means includes bar means having a plurality of recesses formed therein extending between the rung means of the inner and outer rails, said bar means being fixed with respect to one pair of the rails and movable with respect to the other pair of said rails; in which the lever-rachet means is operatively mounted on said other pair of rails and engageable with the bar means for controlling relative movement between the inner and outer rails.

3. The construction defined in claim 2 in which the jack means also includes a pair of sleeve means, each being mounted on and extending between the rung means of a respective one of the inner and outer rails; and in which the bar means is telescopically mounted within the sleeve means.

4. The construction defined in claim 1 in which the spring means is a pair of tension springs, each being mounted within a respective one of the outer rails and engageable with the associated inner rail.

5. The construction defined in claim 1 in which feet means having resilient wall engaging ends are mounted on the outer ends of the inner and outer rails.

6. Extensible cargo brace construction including
   a. a pair of spaced, parallel hollow outer rails having a plurality of rungs extending transversely therebetween, said outer rails having inner and outer ends;
   b. a pair of spaced, parallel inner rails telescopically, slidably mounted with respect to the outer rails and movable between extended and retracted positions, said inner rails having inner and outer ends;
   c. a plurality of rungs extending transversely between the spaced pair of inner rails;
   d. tension spring means mounted within the outer rails and engageable with the inner rails biasing said inner rails inwardly with respect to the outer rails toward retracted positions;
   e. lever-actuated jack means mounted on and extending between certain of the rungs of the inner and outer rails for imparting relative movement between said inner and outer rails, including:
      1. bar means having a plurality of recesses formed therein extending longitudinally between at least the inner endmost rungs of the inner and outer rails, said bar means being fixed with respect to one pair of said rails and movable with respect to the other pair of said rails;
      2. lever-ratchet means operatively mounted on said other pair of rails and engageable with the recesses of the bar means for controlling relative movement between the inner and outer rails; and
      3. directional control means mounted on the lever-ratchet means and movable between retract and expand positions for selectively controlling the direction of movement of the inner and outer rails with respect to each other upon operation of the lever-ratchet means;
   f. the lever-ratchet means positively moving the outer rails outwardly with respect to the inner rails toward extended position upon actuation of said lever-ratchet means with the directional control means in expand position; and
   g. the tension spring means moving the outer rails inwardly with respect to the inner rails toward retracted position upon actuation of the lever-ratchet means with the directional control means in retract position.

7. The construction defined in claim 6 in which the lever-actuated jack means includes first and second sleeve means; in which the first sleeve means is mounted on and extends between at least two of the rungs adjacent the inner end of the outer rails; and in which the second sleeve means is mounted on and extends between at least two of the rungs of the inner rails adjacent to the outer rail rungs.

8. The construction defined in claim 7 in which one end of the bar means extends within and is connected to the first sleeve means; and in which the other end of the bar means extends within the second sleeve means and is telescopically movable with respect to said second sleeve means.

9. The construction defined in claim 8 in which the lever-ratchet means is mounted on the second sleeve means.

10. The construction defined in claim 8 in which said one end of the bar means abuts one of the rungs within the first sleeve means.

* * * * *

UNITED STATES PATENT AND TRADEMARK OFFICE
CERTIFICATE OF CORRECTION

PATENT NO. : 3,995,565
DATED : December 7, 1976
INVENTOR(S) : Henry C. Kersey

It is certified that error appears in the above—identified patent and that said Letters Patent are hereby corrected as shown below:

Column 1, line 37, change "projecting" to - projection -
Column 1, line 40, change "natures" to - nature -
Column 6, line 58, delete the word "the" at end of line (claim 2)
Column 6, line 59, change "rachet" to - ratchet - (claim 2)

Signed and Sealed this

Fifteenth Day of February 1977

[SEAL]

Attest:

RUTH C. MASON
Attesting Officer

C. MARSHALL DANN
Commissioner of Patents and Trademarks